United States Patent [19]

Tamai et al.

[11] 4,388,369

[45] Jun. 14, 1983

[54] MAGNETIC RECORDING MEDIUM

[75] Inventors: Kiminori Tamai; Masashi Hayama, both of Tokyo, Japan

[73] Assignee: TDK Electronics Co., Ltd., Tokyo, Japan

[21] Appl. No.: 341,005

[22] Filed: Jan. 20, 1982

[30] Foreign Application Priority Data

Mar. 30, 1981 [JP] Japan .................................. 56-47045

[51] Int. Cl.$^3$ ............................................. H01F 10/02
[52] U.S. Cl. ..................................... 428/339; 428/900
[58] Field of Search .............................. 427/127–132, 427/48; 252/62.54; 428/900, 694, 339

[56] References Cited

U.S. PATENT DOCUMENTS 3,687,725  8/1972  Hartmann et al. .................. 117/235

Primary Examiner—Bernard D. Pianalto
Attorney, Agent, or Firm—Oblon, Fisher, Spivak, McClelland & Maier

[57] ABSTRACT

A magnetic recording medium comprises a magnetic layer formed by coating a magnetic powder composition obtained by mixing an abrasive powder having an average diameter of 0.8 μm or more and an abrasive powder having an average diameter of 0.4 μm or less and a magnetic powder in a binder, on a base film.

1 Claim, 4 Drawing Figures

MAGNETIC RECORDING MEDIUM

BACKGROUND OF THE INVENTION

1. Field of the Invention

The present invention relates to a magnetic recording medium having a magnetic layer formed by coating a magnetic powder composition on a base film and a preparation thereof.

2. Description of the Prior Art

When an electric resistance of a magnetic layer of a magnetic recording medium is high, electrostatic force is formed to adhere dust to cause a drop-out. Sometimes, electrostatic discharge noise is formed. In order to reduce high electric resistance which causes formation of the electrostatic force, it has been considered to incorporate carbon or a surfactant type antistatic agent in a magnetic layer. However, it causes deterioration of a sensitivity and unstable running.

When steel balls having mohs' hardness of 6 are used in a step of dispersing a magnetic powder in a binder with the steel balls, if an abrasive powder having mohs' hardness of more than 6 is incorporated, the surface of the steel balls is slightly ground by the abrasive powder in the mixing step, whereby the electric conductive steel powder is dispersed in the magnetic powder composition to reduce the electric resistance of the magnetic layer. The incorporation of the abrasive powder is also effective for reinforcing the magnetic layer against wearing of the surface of the magnetic recording tape in high speed recording operation.

The incorporation of the abrasive powder is preferable to reduce an electric resistance or to reinforce a magnetic layer. However there is a problem of wearing of a magnetic head which contacts with the magnetic recording tape when the abrasive powder is incorporated for these effects.

As shown in FIG. 1, the particle size of the abrasive powder highly relates to the electric resistance and the magnetic head wearing. The effect to the electric resistance is opposite to the effect to the magnetic head wearing. If a coarse abrasive powder is incorporated to reduce the electric resistance at a desired degree, the magnetic head wearing is too high and life of the magnetic head is shortened. On the other hand, when the fine abrasive powder is incorporated, it is necessary to incorporate a large amount of the abrasive powder whereby the magnetic characteristics of the magnetic recording tape are inferior.

SUMMARY OF THE INVENTION

It is an object of the present invention to provide a magnetic recording medium which has advantages of a desired reduction of an electric resistance and a reinforcement of the magnetic layer with less wearing of a magnetic head. Another object of the present invention is to provide a process for preparing the magnetic recording medium.

The foregoing and other objects of the present invention have been attained by providing a magnetic recording medium having a magnetic layer formed by coating a magnetic powder composition obtained by mixing an abrasive powder having an average particle size of 0.8 μm or more and an abrasive powder having an average particle size of 0.4 μm or less and a magnetic powder with a binder, on a base film.

DETAILED DESCRIPTION OF THE PREFERRED EMBODIMENTS

The inventors have studied to prepare a magnetic recording medium with an abrasive powder to reduce an electric resistance and to reinforce a magnetic layer with less wearing of a magnetic head and have found a desired magnetic recording medium and a preparation thereof.

Figure 1:
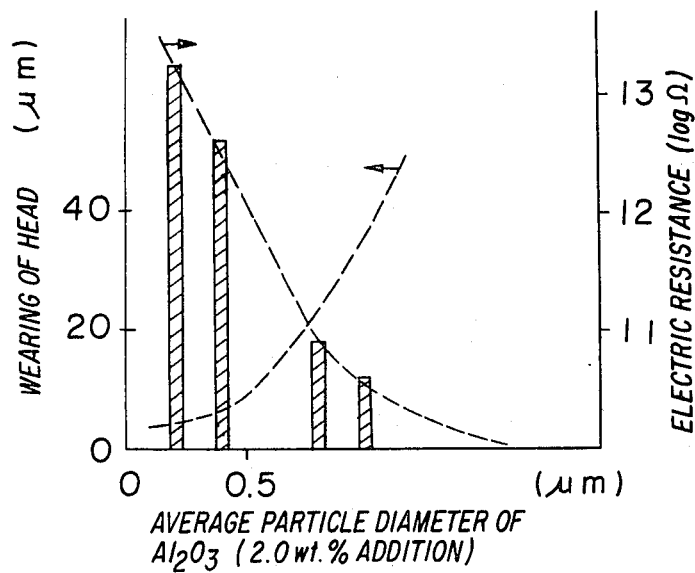
FIG. 1 is a graph of variations of an electric resistance and a wearing of a magnetic resistance depending upon variation of an average particle diameter.

In view of the graph shown in FIG. 1, the abrasive powder having an average particle diameter of 0.8 μm or more and the abrasive powder having an average particle diameter of 0.4 μm or less respectively satisfies with either a desired electric resistance or a desired wearing of a magnetic head. Therefore, the inventors have considered that the application of both two kinds of the abrasive powders is effective in practice. The samples are prepared by using the following components and each electric resistance and each wearing of a magnetic head by the used of the samples are measured.

(I) Component

| | |
|---|---|
| Magnetic powder (γ-Fe$_2$O$_3$): | 100 wt. parts |
| Vinyl chloride-vinyl acetate-vinyl alcohol copolymer: | 20 wt. parts |
| NBR (nitrile rubber): | 5 wt. parts |
| Anionic surfactant: | 2 wt. parts |
| Abrasive powder (average diameter of 0.8 μm or more): | 0-3 wt. parts |
| Abrasive powder (average diameter of 0.4 μm or less): | 0-3 wt. parts |
| Methyl ethyl ketone: | 60 wt. parts |
| Methyl isobutyl ketone: | 60 wt. parts |
| Toluene: | 60 wt. parts |

Al$_2$O$_3$ powder having an average diameter of 0.8 μm was used as Abrasive powder A, Al$_2$O$_3$ powder having an average diameter of 0.2 μm was used as Abrasive powder B.

(II) Sample

The components were charged in a ball mill by varying a content of the abrasive powder. Each mixture was dispersed for 20 hours by mixing with steel balls to prepare each magnetic powder composition. In the mixing, the Al$_2$O$_3$ powder having mohs' hardness was used as the abrasive powder, steel powder as a conductor is dispersed in the composition by grinding the surface of the steel balls.

The resulting magnetic powder composition was coated in a thickness of 6 μm on a polyethyleneterephthalate film having a thickness of 12 μm. After drying the composition, the surface of the magnetic layer was treated by mirror processing with a hot surface Calender roll and the product was cut in a width of 3.81 mm to prepare each audio cassette tape.

(III) Measurement

Each electric resistance of each magnetic recording tape as a sample was measured by applying 1000 V with a gap of 50 mm.

Each wearing of a magnetic head was measured by running each magnetic recording medium at 20° for 100 hours by a cassette deck having a Permalloy magnetic head. As a result, the electric resistances and the wearings of the magnetic head shown in FIG. 2 were measured.

Figure 2:
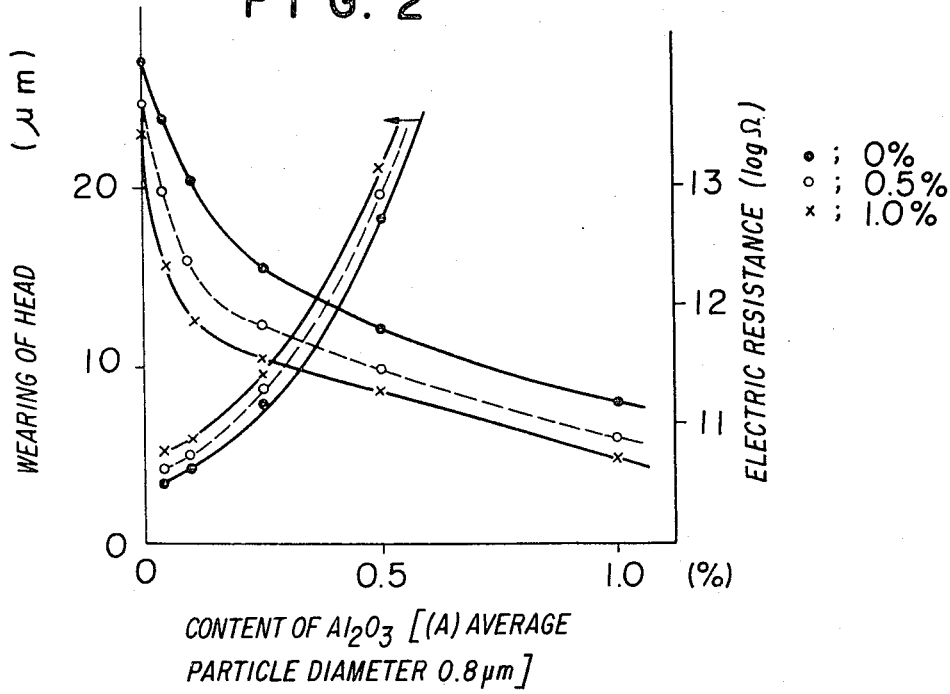
FIG. 2 is a graph of variations of an electric resistance and a wearing of a magnetic head depending upon variation of a content of an abrasive powder having an average particle diameter of 0.8 μm and a content of an abrasive powder having an average particle diameter of 0.2 μm.

According to the graph of FIG. 2, the electric resistance required for the magnetic recording tape is usually $1 \times 10^{12} \Omega$ or less. In the case of the incorporation of only Abrasive powder A ($Al_2O_3$ powder having an average diameter of 0.8 $\mu$m), it is necessary to incorporate the magnetic powder at a content of 0.4% or more to attain the desired electric resistance, whereby the wearing of the magnetic head increases. The wearing of the magnetic head caused by the magnetic recording medium is upto 100 $\mu$m. In the case of the incorporation of only Abrasive powder A ($Al_2O_3$ powder having an average diameter of 0.8 $\mu$m), it is necessary to incorporate the magnetic powder at about 0.33% or less based on the magnetic powder to attain the desired wearing, and accordingly it is difficult to satisfy with the electric resistance.

It has been found to be difficult to satisfy both the electric resistance and the wearing of the magnetic head for a magnetic recording tape in the case of the incorporation of only Abrasive powder A.

It has been found that, a desired result is attained by combining Abrasive powder A and Abrasive powder B at a desired ratio.

When Abrasive powder A ($Al_2O_3$ powder having an average diameter of 0.8 $\mu$m) and Abrasive powder B ($Al_2O_3$ powder having an average diameter of 0.2 $\mu$m) are combined, for example, when Abrasive powder A is incorporated at a ratio of 1.0% of Abrasive powder B, a desired electric resistance was attained. When Abrasive powder A is incorporated at a content of 0.26% or less, the wearing of the magnetic head is satisfactory. Therefore, there is a desired range to satisfy both the electric resistance and the wearing of the magnetic head.

Figure 3:
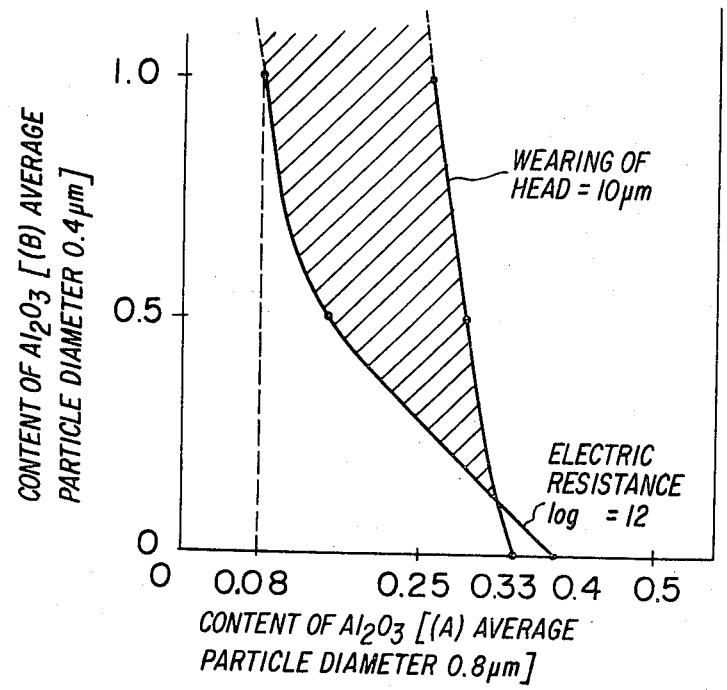
FIG. 3 is a graph of the contents of two kinds of the abrasive powders to satisfy desired electric resistances and wearing of the magnetic head for a magnetic recording tape.
Figure 4:
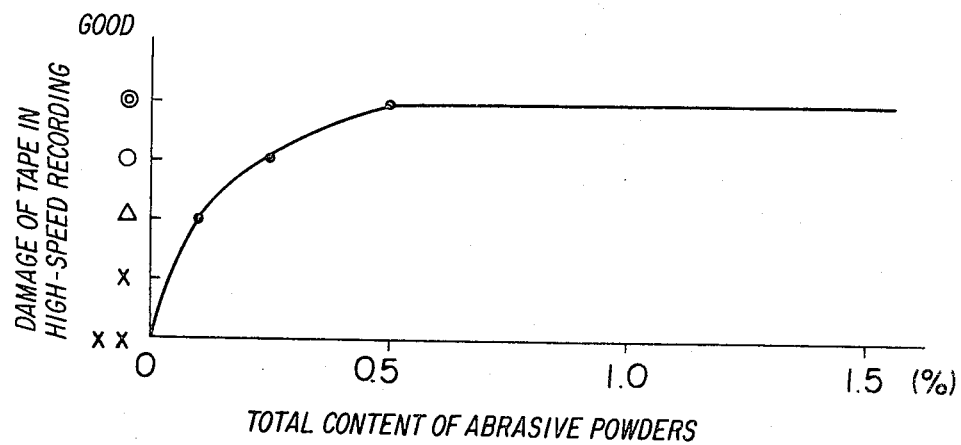
FIG. 4 is a graph of damage of a magnetic recording tape in high speed recording depending upon a total content of two kinds of the abrasive powders.

The range of the content of the abrasive powders for satisfying both the electric resistance and the wearing of the magnetic head is confirmed to be in the range shown by hatching in graph of FIG. 3. Moreover, the damage of the magnetic recording tape caused by a high speed recording is studied to confirm that the tape is desirably durable when the content of Abrasive powder A and Abrasive powder B is 0.1 wt.% or more.

The effect of the abrasive powder for the magnetic characteristics and electromagnetic transfer characteristic and the other characteristics were studied. It is found that a total content of the abrasive powders is preferably in a range of 0.1 to 3 wt.%.

In the examples, $Al_2O_3$ powder was used as Abrasive powder A and Abrasive powder B, it is possible to use the other same or different abrasive powders, for example, SiC powder as Abrasive powder A and $Cr_2O_3$ powder as Abrasive powder B.

The abrasive powders were mixed in the step of mixing the magnetic powder and the binder. It is also possible to prepare a dispersion of the abrasive powders and then to mix the dispersion with a mixture of a magnetic powder and a binder.

In accordance with the process of the present invention, both the abrasive powder having an average diameter of 0.8 $\mu$m or more and the abrasive powder having an average diameter of 0.4 $\mu$m or less are incorporated whereby a magnetic recording medium having both satisfactory characteristics of the electric resistance and the wearing of the magnetic head. Moreover, the dispersing and mixing by using steel balls can be effectively attained.

We claim:

1. A magnetic recording medium comprising a magnetic layer on a base film said magnetic layer comprising a magnetic powder composition in a binder, said magnetic powder composition consisting essentially of a magnetic powder and from 0.1 to 3.0 wt. percent based on said magnetic powder of a mixture of (a) an abrasive powder having an average particle diameter of 0.4 $\mu$m or less and (b) an abrasive powder having an average particle diameter of 0.8 $\mu$m or more, said abrasive particles having a moh's hardness or greater than 6, wherein the ratio of (a) and (b) is in a range of 1.0:0.08 to 1.0 to 0.33.

* * * * *